(12) United States Patent
Pagot

(10) Patent No.: US 7,395,813 B2
(45) Date of Patent: Jul. 8, 2008

(54) METHOD OF CONTROLLING THE INTAKE AND/OR THE EXHAUST OF AT LEAST ONE DEACTIVATED CYLINDER OF AN INTERNAL-COMBUSTION ENGINE

(75) Inventor: Alexandre Pagot, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/562,499

(22) Filed: Nov. 22, 2006

(65) Prior Publication Data

US 2007/0215119 A1    Sep. 20, 2007

(30) Foreign Application Priority Data

Nov. 24, 2005    (FR)    ................................. 05 11999

(51) Int. Cl.
*F02D 17/02*    (2006.01)

(52) U.S. Cl. .................... 123/481; 123/198 F; 73/119 R

(58) Field of Classification Search ................. 123/481, 123/492, 90.23, 198 D, 198 DB, 198 F, 339.1; 701/101, 108, 110, 112, 114; 60/284, 285
See application file for complete search history.

(56) References Cited

U.S. PATENT DOCUMENTS

| | | | | |
|---|---|---|---|---|
| 4,411,229 A * | 10/1983 | Curtis et al. | ............. | 123/198 F |
| 4,414,935 A * | 11/1983 | Curtis et al. | ............. | 123/198 F |
| 5,467,748 A * | 11/1995 | Stockhausen | ............ | 123/198 F |
| 5,642,703 A * | 7/1997 | Stockhausen et al. | .... | 123/198 F |
| 6,332,446 B1 * | 12/2001 | Matsumoto et al. | ...... | 123/198 F |
| 6,431,154 B1 * | 8/2002 | Inoue | ......................... | 123/481 |
| 6,615,776 B1 | 9/2003 | Andrian-Werburg | | |
| 6,857,491 B2 * | 2/2005 | Wakashiro et al. | ......... | 180/65.2 |
| 7,204,226 B2 * | 4/2007 | Zillmer et al. | .............. | 123/295 |
| 7,260,467 B2 * | 8/2007 | Megli et al. | ................. | 701/101 |
| 2002/0189575 A1 | 12/2002 | Rayl et al. | | |
| 2005/0131618 A1 | 6/2005 | Megli et al. | | |

FOREIGN PATENT DOCUMENTS

| | | |
|---|---|---|
| DE | 3315396 A1 | 10/1984 |
| DE | 10159758 A1 | 7/2003 |
| DE | 10260169 A1 | 7/2004 |
| JP | 2001-140665 | 5/2001 |

\* cited by examiner

*Primary Examiner*—Willis R. Wolfe, Jr.
*Assistant Examiner*—Johnny H. Hoang
(74) *Attorney, Agent, or Firm*—Antonelli, Terry, Stout & Kraus, LLP.

(57) ABSTRACT

A method controls the intake and/or the exhaust of at least one deactivated cylinder (10, 12, 14, 16) of an internal-combustion engine operating in four phases. The cylinder includes an intake with an intake valve (28), an exhaust with an exhaust valve (34), a fuel injector (42), an ignition (48) and a piston sliding within this cylinder between a position corresponding to its top dead center (PMHa, PMHd) and a position corresponding to its bottom dead center (PMBa, PMBd). When the engine runs at low or partial loads, one of the valves (28, 34) of the deactivated cylinder is opened in the vicinity of a top dead center (PMHa, PMHd). This valve is closed in the vicinity of the next top dead center (PMHd, PMHa).

7 Claims, 1 Drawing Sheet

METHOD OF CONTROLLING THE INTAKE AND/OR THE EXHAUST OF AT LEAST ONE DEACTIVATED CYLINDER OF AN INTERNAL-COMBUSTION ENGINE

FIELD OF THE INVENTION

The present invention relates to a method allowing to control the intake and/or the exhaust of at least one deactivated cylinder of an internal-combustion engine operating in four phases.

This invention applies more particularly to an engine with at least two cylinders comprising combustion chambers wherein combustion of a fuel mixture occurs. It is notably intended for gasoline type direct or indirect injection engines but it does not dismiss in any way Diesel type direct injection engines.

BACKGROUND OF THE INVENTION

An engine usually runs with all of its cylinders. However, when this engine works at low or partial loads, the engine efficiency is degraded by the increase in the contribution of frictions and of throttling in the case of gasoline type engines.

It has been proposed operating only part of the cylinders of this engine, thus making the remaining part inactive. Fuel injection is therefore stopped only in the cylinders to be deactivated. This allows the reduction of fuel consumption to be favoured by injecting the fuel required only for the cylinders necessary for production of the energy needed to operate the engine at low or partial loads.

Although this engine running type is satisfactory, it however involves some quite significant drawbacks.

In fact, since the lift laws of the exhaust and intake valves remain unchanged, the different phases known as expansion and compression of the inactive cylinder(s) will lead to running problems.

Thus, as it is well known, during the usual expansion phase of the cylinder of an engine, the combustion chamber of this cylinder contains a compressed fuel mixture that burns away while carrying out expansion of the volume present in this chamber. During this phase, the exhaust and intake valves are closed and the piston is driven in a motion towards its bottom dead center under the effect of the expansion of the burnt gas by transmitting the energy thereof to the crankshaft it is connected to.

When cutting off fuel supply to the cylinder to be made inactive, no fuel mixture occurs in the combustion chamber and only a volume of compressed air is present. During the phase of this cylinder which corresponds to its expansion phase, the piston is not subjected to a force resulting from the expansion of the burnt gases but it only stretches a volume of air compressed by the previous engine running phase. This stretching generates cooling of the air contained in the cylinder and this temperature drop is transmitted to the oil film usually present on the cylinder wall. The oil film cools down and loses its lubricating qualities, notably as regards the viscosity thereof, which leads to bad lubrication between the piston and the cylinder, which may cause sticking between these two parts.

This cooling is still more marked during the exhaust phase of the inactive cylinder, during motion of the piston from the bottom to the top of the cylinder. During this motion, the cold expanded air is pushed by the piston towards the exhaust valve and travels the surface of the oil film. This increases cooling of the oil film with a greater loss of the lubricating qualities thereof. Still more disadvantageously, this air leaving the chamber is sent to the exhaust channel by feeding a significant amount of oxygen into the hot gases from the combustion of the active cylinders. This oxygen supply is not only harmful for the reliability of the exhaust gas fuel/air ratio measurement, in case a depollution means is used, it also involves an exhaust gas afterburning risk if this gas contains a sufficient residual amount of fuel.

Furthermore, during the expansion phase of the inactive cylinder, the piston that slides in this cylinder is no longer a piston generating energy to be transmitted to the crankshaft. In fact, the combustion chamber contains no compressed fuel mixture that expands upon combustion, but only compressed air. This piston therefore acts as an energy absorber. In fact, since no combustion occurs in this cylinder, the piston is only driven, in a motion from the top to the bottom of this cylinder, by the crankshaft that is subjected to a rotating motion produced by the active cylinder(s). These cylinders therefore have to generate an additional energy to drive the piston of the deactivated cylinder. This additional energy is all the higher as the piston lubrication conditions in the inactive cylinder are degraded by the expansion of the compressed air.

The present invention aims to overcome the aforementioned drawbacks by means of a simple and economical method allowing to reduce even more the fuel consumption and to minimize the energy loss due to the inactive cylinder.

SUMMARY OF THE INVENTION

The present invention thus relates to a method for controlling the intake and/or the exhaust of at least one deactivated cylinder of an internal-combustion engine operating in four phases, said cylinder comprising intake means with an intake valve, exhaust means with an exhaust valve, a fuel injection means, ignition means and a piston sliding within this cylinder between a position corresponding to its top dead center and a position corresponding to its bottom dead center, characterized in that, when the engine runs at low or partial loads:

one of the valves of the deactivated cylinder is opened in the vicinity of a top dead center, this valve is closed in the vicinity of the next top dead center.

The exhaust valve can be opened in the vicinity of a dead center corresponding to the start of the engine expansion phase, so as to admit exhaust gas to the inactive cylinder.

It is also possible to open one of the valves successively upon closure of the other valve.

An overlap between the exhaust valve and the intake valve of the deactivated cylinder can be performed so as to achieve fresh air scavenging in the inactive cylinder.

At least one cylinder can be deactivated by not supplying this cylinder with fuel.

It is also possible to cut off supply to the deactivated cylinder ignition means.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
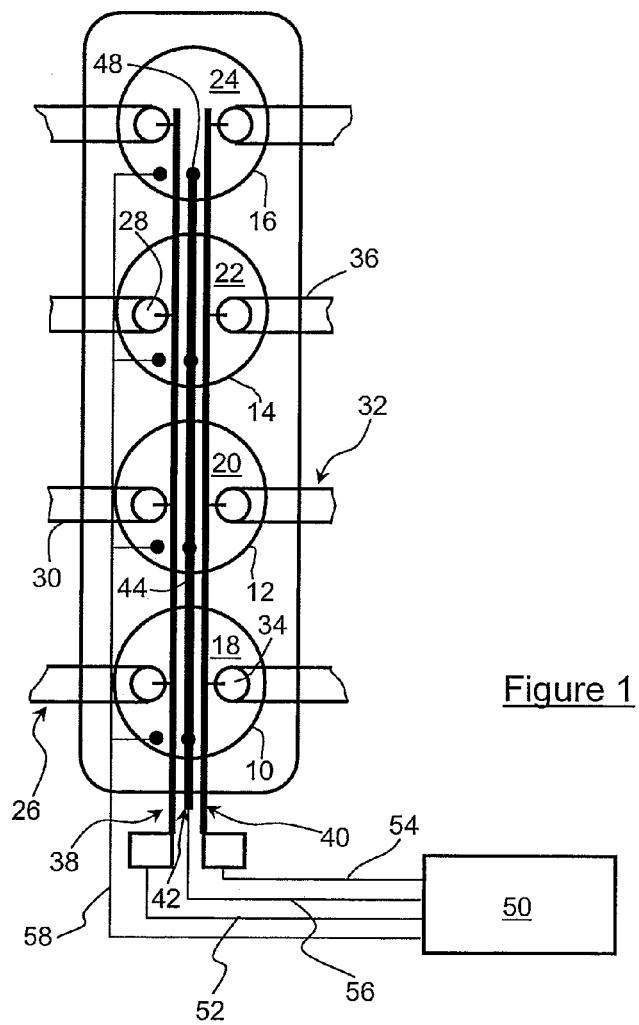
FIG. 1 shows an internal-combustion engine using the method according to the invention.

FIG. 1 illustrates a non limitative example of embodiment of the invention with an internal-combustion engine of direct fuel injection type, notably a gasoline type engine.

This engine comprises at least two cylinders, here four cylinders 10, 12, 14, 16 within which a piston (not shown) slides in a reciprocating rectilinear motion while being connected to a crankshaft (not shown). The piston thus delimits with the cylinder a combustion chamber 18, 20, 22, 24 where combustion of a fuel mixture can occur when the conditions required for such a combustion are met. This piston thus oscillates between an upper position referred to as top dead center (PMH), where the combustion chamber occupies a reduced volume, and a lower position, referred to as bottom dead center (PMB), where the volume of the combustion chamber is the larger. Each cylinder comprises intake means 26 with an intake valve 28 controlling an intake pipe 30 and exhaust means 32 with an exhaust valve 34 and an exhaust pipe 36.

Opening and closing of the intake 28 and exhaust 24 valves is controlled by actuation means 38, respectively 40, allowing to vary the lift laws of these valves, in particular as regards their opening and closing moments, independently of one another. These means are better known as VVT (Variable Valve Timing) or VVL (Variable Valve Lift).

The engine also comprises fuel supply means 42 allowing fuel to be fed into each combustion chamber of the cylinders. By way of example, these means comprise an injection ramp 44 supplying injection nozzles 46.

The intake 26 and exhaust 32 means, as well as fuel supply means 42, open into the combustion chambers in order to achieve therein a fuel mixture for combustion of this mixture. Advantageously, ignition means such as a plug 48 are arranged in each cylinder in order to ignite the fuel mixture present in the combustion chambers.

Valve actuation means 38 and 40, fuel supply means 42 and ignition means 48 are operated by a control unit 50 through control lines 52, 54, 56, 58. This unit contains mappings or data tables allowing to change the valve lift laws according to engine running conditions such as the engine speed or load. This unit also allows to control the fuel injection parameters, the fuel supply or non-supply level of each injection nozzle as well as the injection time for each injection nozzle by controlling the fuel injection moment and duration in the engine running cycle. This unit also allows to control the ignition means parameters such as the electric power supplied to the plug and/or the electric power cut, the moment of this supply and the duration of the spark provided by this plug.

Figure 2:
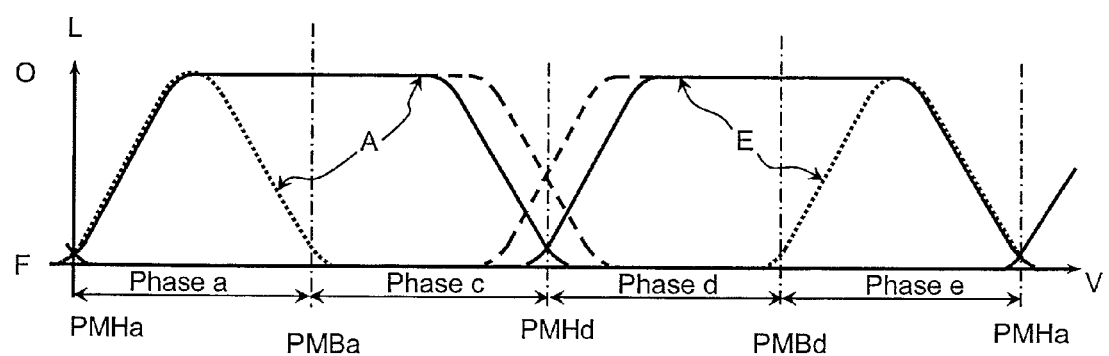
FIG. 2 is a graph illustrating the valve lift laws (L) as a function of the various positions of the piston (V), according to the prior art (dotted line) and according to the invention (full line).

FIG. 2 now shows the lift laws of the intake (A) and exhaust (E) valves according to the invention (in full line) and according to the prior art (in dotted line) during an engine running cycle, i.e. during the four running phases: intake (Phase a)—compression (Phase c)—expansion (Phase d)—exhaust (Phase e).

According to the operation of the engine from the prior art, valves A and E of an inactive cylinder, whose lift laws are shown in dotted line between a fully closed position (F) and a fully open position (O), are controlled in such a way that intake valve A of an inactive cylinder opens in the vicinity of the intake top dead center (PMHa) of the piston, whereas exhaust valve E of this cylinder is closed. In the vicinity of the intake bottom dead center (PMBa) of this piston, the intake valve closes after allowing, between these two points, intake, into the combustion chamber, of a fluid such as air, possibly supercharged, or a mixture of recirculated gas and air (EGR). This valve remains closed between the intake bottom dead center PMBa and the expansion top dead center PMHd of the piston, thus allowing compression of the air admitted by the piston. During this PMBa-PMHd interval, control unit 48 controls injection nozzle 46 of the cylinder concerned so that no fuel is injected into the combustion chamber during motion of the piston and/or in the vicinity of the expansion top dead center PMHd so that no fuel mixture is achieved therein. Between this PMHd and the expansion bottom dead center PMBd, the intake valve is kept closed and the piston moves from PMHd to PMBd. While maintaining intake valve A in closed position, exhaust valve E opens in the vicinity of PMBd, thus allowing the fluid contained in the chamber to be discharged out of this chamber until this exhaust valve closes in the vicinity of PMHa. From this point, the cycle is repeated according to the same sequence as long as it is necessary to have an inactive cylinder.

As mentioned above, during operation of the engine at low or partial loads, part of the cylinders 10, 12, 14, 16 is made inactive by cutting off fuel injection while the other part of the cylinders is kept active by maintaining the injection and possibly ignition parameters.

By way of example, in case an engine runs according to a sequence referred to as 1, 3, 4, 2, where cylinder 10 is in the expansion phase, then cylinder 14, then cylinder 16 and finally cylinder 12, cylinders 10 and 16 will be deactivated. Control unit 50 therefore acts on the fuel supply means 42 of inactive cylinders 10 and 16 by cutting off fuel injection into combustion chambers 18 and 24 of these cylinders. Advantageously, the unit also cuts off the electric power supplied to plugs 48 of these inactive cylinders, which allows unnecessary power consumption to be prevented.

This control unit also acts on means 38 and 40 controlling the intake 28 and exhaust 34 valves of these inactive cylinders, as explained in detail in the description hereafter.

As illustrated in FIG. 2 in full line, control unit 48 controls actuation means 38 and 40 in such a way that intake valve A opens in the vicinity of the intake top dead center PMHa whereas exhaust valve E is closed. This intake valve remains open in the vicinity of the intake bottom dead center PMBa, then it closes in the vicinity of the expansion top dead center PMHd.

Thus, during the piston intake stroke between PMHa and PMBa (phase a), fresh air (or supercharged air with possibly EGR) is fed into the combustion chamber of the inactive cylinder. This air, instead of being compressed, is discharged through the open intake valve during motion of the piston between PMBa and PMHd (phase c). Fresh air is therefore fed into the chamber and this air is discharged from this chamber without the pressure or the temperature thereof being changed. Furthermore, the negative effects due to the piston pumping phenomenon and the resistance generally generated by compression of the air admitted are reduced.

In the remainder of the running cycle of this inactive cylinder, exhaust valve E opens in the vicinity of PMHd and intake valve A remains in closed position. The exhaust valve is kept open beyond the expansion bottom dead center PMBd (phase d), then it closes in the vicinity of the intake top dead center PMHa (phase e). Opening of the exhaust valve and motion of the piston towards the bottom of the cylinder (phase d) causes the hot exhaust gas contained in the exhaust flow path, such as the exhaust pipes or the exhaust manifold connected to these pipes, to be sucked into the combustion chamber through this exhaust valve. During the opposite motion of the piston towards PMHa (phase e), the hot gas contained in this chamber is discharged towards the exhaust flow path. Thus, only hot exhaust gas is sent into the exhaust flow path and no additional amount of oxygen is sent into this flow path.

Of course, the active cylinders follow the conventional course of the phases during the operation described above for the inactive cylinders.

Advantageously, an overlap can be achieved between the intake and exhaust valves in the vicinity of PMHd. This overlap allows to replace the fresh air contained in the combustion chamber at the end of phase c by burnt gas. Thus, only burnt gas is present at the end of phase c, instead of a mixture of fresh air and burnt gas. This allows to avoid sending oxygen into the exhaust flow path.

To obtain this overlap, intake valve A remains open beyond PMHd (by some ten crank angle degrees after this top dead center) and exhaust valve E opens well before PMHd (also by some ten crank angle degrees, but before this top dead center), as illustrated by dashes in FIG. 2. Since the pressure of the burnt gas in the exhaust flow path is higher than the pressure of the fresh air contained in the combustion chamber in the vicinity of the end of phase c, this burnt gas flows into the combustion chamber as the exhaust valve opens while scavenging this fresh air. More precisely, this burnt gas drives the fresh air towards the intake valve from which it is sent to the intake pipe, and only burnt gas is present in the combustion chamber when the piston starts its motion of phase d, from top to bottom of the cylinder.

The present invention is not limited to the embodiment example described and it encompasses any equivalent or variant.

Notably, the above description also applies to supercharged engines or not, direct or indirect injection engines, and notably to spark-ignition engines.

The invention claimed is:

1. A method of controlling intake and/or the exhaust of at least one deactivated cylinder of an internal-combustion engine operating in four phases, said at least one deactivated cylinder comprising intake means with an intake valve, exhaust means with an exhaust valve, a fuel injection means, ignition means and a piston sliding within said at least one deactivated cylinder between a position corresponding to its top dead center (PMHa, PMHd) and a position corresponding to its bottom dead center (PMBa, PMBd), characterized in that, when the engine runs at low or partial loads:
   one of the intake valve and exhaust valve of the deactivated cylinder is opened in the vicinity of a top dead center (PMHa, PMHd),
   said one of the intake valve and exhaust valve remains open until it is closed in the vicinity of the next top dead center (PMHd, PMHa).

2. A method as claimed in claim 1, characterized in that exhaust valve is opened in the vicinity of a top dead center (PMHd) corresponding to the start of the engine expansion phase, so as to admit exhaust gas to the inactive cylinder.

3. A method as claimed in claim 1, characterized in that said one of the intake valve and exhaust valve is opened successively upon closure of the other of said intake valve and exhaust valve.

4. A method as claimed in claim 1, characterised in that an overlap is achieved between exhaust valve and intake valve of the deactivated cylinder so as to obtain scavenging of the fresh air in the inactive cylinder.

5. A method as claimed in claim 1, characterized in that said at least one cylinder is deactivated by not supplying this cylinder with fuel.

6. A method as claimed in claim 1, characterized in that said at least one cylinder is deactivated by cutting off supply to the deactivated cylinder ignition means.

7. A method as claimed in claim 1, characterized in that said one of the intake valve and exhaust valve is the intake valve.

* * * * *